US008230014B2

(12) United States Patent
Uchikawa

(10) Patent No.: US 8,230,014 B2
(45) Date of Patent: Jul. 24, 2012

(54) INFORMATION PROCESSING APPARATUS, METHOD FOR CONTROLLING THEREOF AND COMPUTER PROGRAM

(75) Inventor: Shinichi Uchikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 273 days.

(21) Appl. No.: 12/470,193

(22) Filed: May 21, 2009

(65) Prior Publication Data

US 2009/0292772 A1 Nov. 26, 2009

(30) Foreign Application Priority Data

May 26, 2008 (JP) ................................. 2008-136682

(51) Int. Cl.
 *G06F 15/16* (2006.01)
(52) U.S. Cl. ........................ 709/204; 709/223; 709/224
(58) Field of Classification Search .................. 709/204, 709/223–224
 See application file for complete search history.

(56) References Cited

U.S. PATENT DOCUMENTS

| | | | | |
|---|---|---|---|---|
| 6,789,120 | B1 * | 9/2004 | Lee et al. | 709/227 |
| 2002/0040408 | A1 * | 4/2002 | Choi | 709/245 |
| 2003/0169728 | A1 * | 9/2003 | Choi | 370/352 |
| 2004/0122812 | A1 * | 6/2004 | Yoshimura et al. | 707/3 |
| 2005/0015507 | A1 * | 1/2005 | Chin | 709/230 |
| 2005/0138137 | A1 * | 6/2005 | Encarnacion et al. | 709/217 |
| 2005/0138179 | A1 * | 6/2005 | Encarnacion et al. | 709/227 |
| 2006/0031530 | A1 * | 2/2006 | Iizuka | 709/227 |
| 2006/0047668 | A1 * | 3/2006 | Kang | 707/10 |
| 2008/0013538 | A1 * | 1/2008 | Lee et al. | 370/390 |
| 2008/0104035 | A1 * | 5/2008 | Uchikawa | 707/3 |
| 2008/0275940 | A1 * | 11/2008 | Yamada et al. | 709/203 |
| 2009/0094317 | A1 * | 4/2009 | Venkitaraman | 709/203 |

FOREIGN PATENT DOCUMENTS

JP 2001-216107 A 8/2001

* cited by examiner

*Primary Examiner* — David Lazaro
*Assistant Examiner* — Waseem Ashraf
(74) *Attorney, Agent, or Firm* — Canon USA Inc IP Division

(57) ABSTRACT

An information processing apparatus includes a storage unit adapted to store information of the plurality of image forming apparatuses, a reception unit adapted to receive from an other information processing apparatus a request to acquire information of the plurality of image forming apparatuses stored by the storage unit, a determination unit adapted to, by comparing an address of the image forming apparatus stored by the storage unit with an address of another information processing apparatus, determine whether the image forming apparatus has the address which another information processing apparatus can access, and a transmission unit adapted to transmit to another information processing apparatus the information of the image forming apparatus having the address which is determined by the determination unit to be accessible from another information processing apparatus.

11 Claims, 14 Drawing Sheets

FIG.7

```
<Envelope>
    <Header>
        <Action>Hello</Action>
        <MessageID>1</MessageID>
        <To>urn:discovery</To>
    </Header>
    <Body>
        <Hello>
            <EndpointReference>
                <Address>urn:uuid:123456</Address>
            </EndpointReference>
            <Types>MFP</Types>
            <XAddrs>http://192.168.0.1/wsd/mex</XAddrs>
            <MetadataVersion>1</MetadataVersion>
        </Hello>
    </Body>
</Envelope>
```

701 (Header section)

701 (Body section)

FIG.8

```
<Envelope>
    <Header>
        <Action>Bye</Action>
        <MessageID>1</MessageID>
        <To>urn:discovery</To>
    </Header>
    <Body>
        <Bye>
            <EndpointReference>
                <Address>urn:uuid:123456</Address>
            </EndpointReference>
        </Bye>
    </Body>
</Envelope>
```

FIG.9

```
<Envelope>
    <Header>
        <Action>Probe</Action>
        <MessageID>1</MessageID>
        <To>urn:discovery</To>
    </Header>
    <Body>
        <Probe>
            <Types>Printer</Types>
        </Probe>
    </Body>
</Envelope>
```

FIG.10

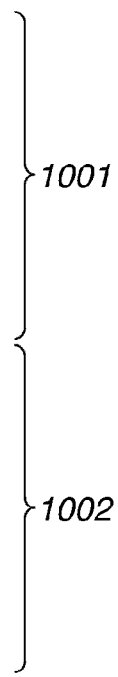

```
<Envelope>
    <Header>
        <Action>ProbeMatch</Action>
        <MessageID>1</MessageID>
        <To>anonymous</To>
    </Header>
    <Body>
        <ProbeMatches>
            <ProbeMatch>
                <EndpointReference>
                    <Address>urn:uuid:123456</Address>
                </EndpointReference>
                <Types>Printer</Types>
                <XAddrs>http://192.168.0.1/wsd/mex</XAddrs>
                <MetadataVersion>1</MetadataVersion>
            </ProbeMatch>
            <ProbeMatch>
                <EndpointReference>
                    <Address>urn:uuid:987654</Address>
                </EndpointReference>
                <Types>Printer</Types>
                <XAddrs>http://[fe80::215:60ff.fea0:2a9e]/wsd/mex</XAddrs>
                <MetadataVersion>1</MetadataVersion>
            </ProbeMatch>
        </ProbeMatches>
    </Body>
</Envelope>
```

}1001

}1002

INFORMATION PROCESSING APPARATUS, METHOD FOR CONTROLLING THEREOF AND COMPUTER PROGRAM

BACKGROUND OF THE INVENTION

1. Field of the Invention

The present invention relates to an information processing apparatus connected to a plurality of image forming apparatuses and a method for controlling thereof.

2. Description of the Related Art

A conventional device such as a printer is connected to a network and used from a client personal computer (PC) via a network. When using the device, the client PC firstly needs to discover the device in the network and install driver software for using the discovered device.

Some possible technologies for searching a device in the network include a technology for transmitting a search request packet via a broadcast or a multicast. The broadcast or the multicast is a method for transmitting data to a plurality of apparatuses existing in the network.

According to the technologies, the client PC transmits the search request packet via the broadcast or the multicast and a device receiving the search request packet transmits the search response packet to the client PC so that the client PC can search the device.

Further, the networks are mutually connected by a connection device such as a router so that a large scale of network can be established. Since the broadcast and the multicast have influence on traffic in the whole network, the router is generally set not to allow the broadcast and the multicast to pass therethrough.

The network separated via the router is referred to as a subnetwork. The broadcast and the multicast are generally used within the subnetwork. In this circumstance, when a technology for searching the network device using the broadcast or the multicast is used, the search request packet transmitted by the client PC cannot pass through the router. Therefore, in the network circumstance where a plurality of subnetworks is connected via the router, the client PC could not discover the device existing in a different subnetwork.

Thus, a search system where a search can be performed even between the device and the client PC that exist in the different subnetworks has been considered. As one example, a server (discovery proxy (DP)) for searching is provided in the network. According to the technology, the search request message including a search condition is transmitted from the client PC to the DP. Instead of the client PC, the DP receiving the search request message searches for the device (for example, Japanese Patent Application Laid-Open No. 2001-216107).

Address information of the device is registered in the DP as attribute information of the device in the network.

The address information includes, for example, an Internet protocol (IP) address and a fully qualified domain name (FQDN). The address information can be a link local address. The link local address is an effective address only within a subnetwork, and cannot be used over the router. The IPv4 link local address is defined by the RFC 3927 and uses a range of 169. 254.0.0/16 as the address. Further, the IPv6 link local address is defined by an RFC 3306 or an RFC 4489 and uses a range of FE80::/10 as the address.

According to the conventional technology, when the search request is transmitted from the client PC to the DP, the DP transmits a response with respect to all devices satisfying the search condition. More specifically, the DP transmits the response also with respect to the above link local address, if the device satisfies the search condition. When the client PC that has transmitted the search request exists in the subnetwork different from the device corresponding to the link local address included in the search result, the search result becomes useless, since the client PC cannot access the link local address.

As described above, according to the conventional technology, for example, when the search result of the device search is acquired from the server, the search result includes the device which the information processing apparatus transmitting the search request cannot access. In other words, the information processing apparatus acquires useless information from the server.

SUMMARY OF THE INVENTION

The present invention is directed to an information processing apparatus connected to a network that does not acquire information useless for the information processing apparatus when acquiring the information from the server.

According to an aspect of the present invention, an information processing apparatus connected to a plurality of image forming apparatuses, includes a storage unit adapted to store information of the plurality of image forming apparatuses, a reception unit adapted to receive from another information processing apparatus a request to acquire information of the plurality of image forming apparatuses stored by the storage unit, a determination unit adapted to, by comparing an address of the image forming apparatus stored by the storage unit with an address of another information processing apparatus, determine whether the image forming apparatus has the address which another information processing apparatus can access, and a transmission unit adapted to transmit to another information processing apparatus the information of the image forming apparatus having the address which is determined by the determination unit to be accessible from the other information processing apparatus.

According to another aspect of the present invention, an information processing apparatus connected to a plurality of image forming apparatuses, includes a storage unit adapted to store addresses of the plurality of image forming apparatuses, a transmission unit adapted to transmit to another information processing apparatus the address of the image forming apparatus stored by the storage unit, and a determination unit adapted to determine whether the information processing apparatus and another information processing apparatus exist in a same subnetwork, wherein the transmission unit transmits the addresses of the plurality of image forming apparatuses stored by the storage unit when the determination unit determines that the information processing apparatus and another information processing apparatus exist in the same subnetwork, and transmits the addresses excluding a link local address from among the addresses of the plurality of image forming apparatuses stored by the storage unit when the determination unit does not determine that the information processing apparatus and another information processing apparatus exist in the same subnetwork.

According to another aspect of the present invention, an information processing apparatus includes a reception unit adapted to receive addresses of a plurality of image forming apparatuses transmitted from another information processing apparatus, a determination unit adapted to determine whether the information processing apparatus and another information processing apparatus exist in a same subnetwork, a storage unit adapted to store the addresses of the plurality of image forming apparatus received by the reception unit when the determination unit determines that the information processing apparatus and the other information processing apparatus exist in the same subnetwork, and store the addresses excluding a link local address from among the addresses of the plurality of image forming apparatuses received by the reception unit when the determination unit does not determine that the information processing apparatus and another information processing apparatus exist in the same subnetwork.

According to another aspect of the present invention, an information processing apparatus includes a transmission unit adapted to transmit to another information processing apparatus a search request to search for an image forming apparatus, a reception unit adapted to receive a search result for the search request from another information processing apparatus, a determination unit adapted to, by comparing each address of a plurality of image forming apparatuses included in the search result received by the reception unit with an address of the information processing address, determine whether the image forming apparatus has the address accessible from the information processing apparatus, and a display unit adapted to display the address of the image forming apparatus excluding an address which is determined by the determination unit determines to be inaccessible from the information processing apparatus.

Further features and aspects of the present invention will become apparent from the following detailed description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 7 is an example of a Hello message according to the first exemplary embodiment.

FIG. 8 is an example of a Bye message according to the first exemplary embodiment.

FIG. 9 is a Probe message according to the first exemplary embodiment.

FIG. 10 is a ProbeMatch message according to the first exemplary embodiment.

DETAILED DESCRIPTION OF THE EMBODIMENTS

Various exemplary embodiments, features, and aspects of the invention will be described in detail below with reference to the drawings.

Figure 1:
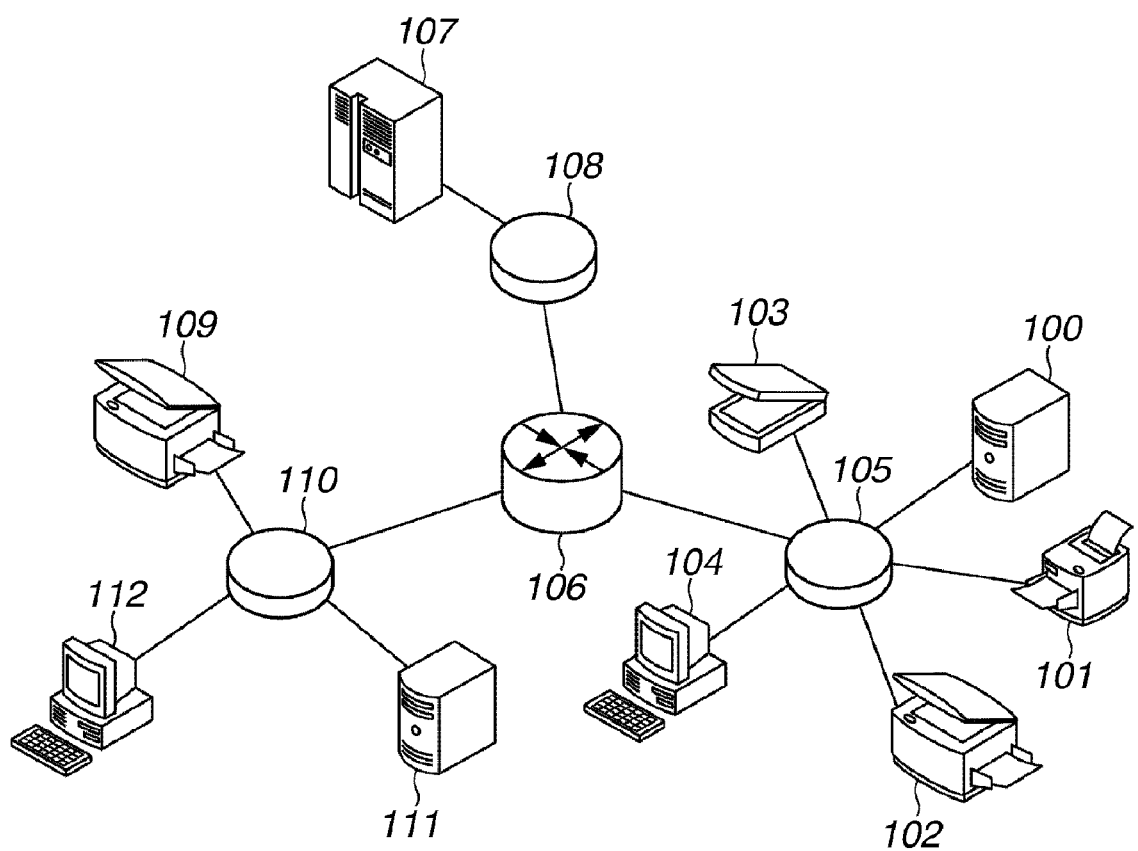
FIG. 1 is a diagram illustrating a configuration of a device search system according to a first exemplary embodiment.

FIG. 1 illustrates a configuration of a device search system to which the present invention is applied. The system as illustrated in FIG. 1 is formed by a local area network (LAN) and includes subnetworks 105, 108 and 110 that are connected to each other via a router 106. The subnetwork 105 is connected to a DP 100, a client PC 104 and image forming apparatuses 101, 102, and 103.

The subnetwork 108 is connected to a DP 107. The subnetwork 110 is connected to a DP 111, an image forming apparatus 109, and a client PC 112. The client PC is one example of the information processing apparatus and includes a personal computer, a workstation and a mobile terminal. The image forming apparatus is a device for providing a service to the client PC such as a print device, a copy machine, a scanner, a facsimile, and a multi function peripheral.

The DP is a server for managing information of the client PC and the image forming apparatus that are connected in the network. And, the DP searches for the image forming apparatus satisfying a condition according to a request from the client PC. In the system as illustrated in FIG. 1, the DP 107 collects and manages information of the image forming apparatus managed by the other DPs 100 and 111, in a collective manner.

In the system as illustrated in FIG. 1, since subnetworks are connected to each other via the router 106, all terminals connected to the subnetworks can mutually communicate. However, the router 106 does not pass a broadcast received from one subnetwork or a multicast packet specified to be transmitted only to a local subnetwork, to other subnetworks. Therefore, communication via the broadcast or the multicast can be performed only within each subnetwork.

Figure 2:
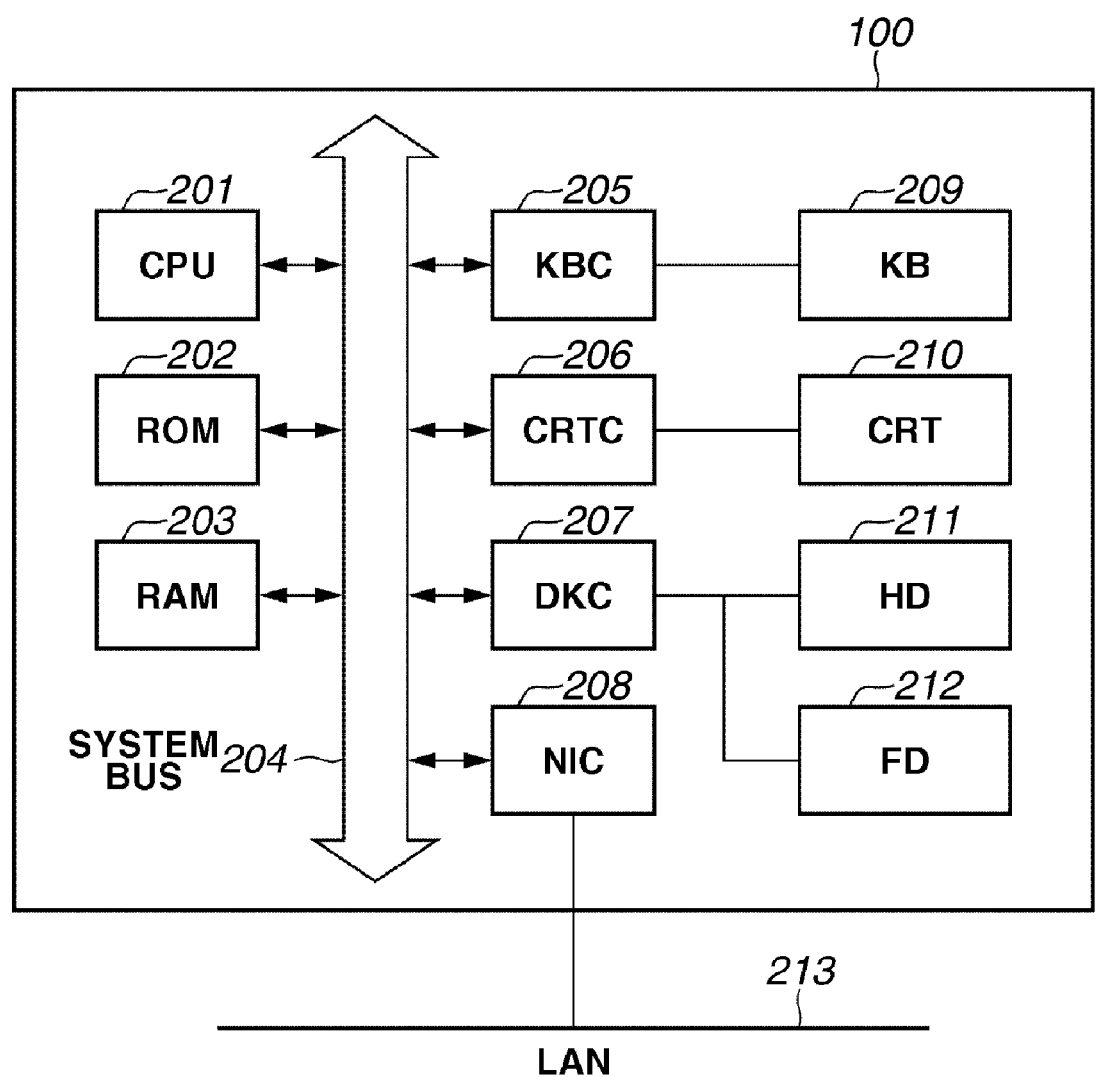
FIG. 2 is a block diagram illustrating a hardware configuration of a DP and a client PC.

FIG. 2 illustrates a hardware configuration of the DP 100. The DP according to the present exemplary embodiment has a configuration of a general PC. The DPs 111 and 107, and the client PCs 104 and 112 as illustrated in FIG. 1 also have a hardware configuration of the general PC.

A central processing unit (CPU) 201 executes various types of softwares that are recorded in a read only memory (ROM) 202 or a hard disk (HD) 211 or supplied from a floppy (registered trademark) disk drive (FD) 212. And, the CPU 201 controls each of units connected to a system bus 204. A random access memory (RAM) 203 functions as a main memory and a work area of the CPU 201.

A keyboard controller (KBC) 205 controls an instruction input from a keyboard (KB) 209 or a pointing device (not illustrated). A CRT controller (CRTC) 206 controls a display of a CRT display (CRT) 210.

A disk controller (DKC) 207 controls access to the HD 211 and the FD 212. The HD 211 or the FD 212 stores a boot program, a dispersed server system program, various types of applications, an edition file, and a user file.

A network interface card (NIC) 208 transmits data between the image forming apparatus and other information processing apparatus via a local area network (LAN) 213 in both directions.

Figure 3:
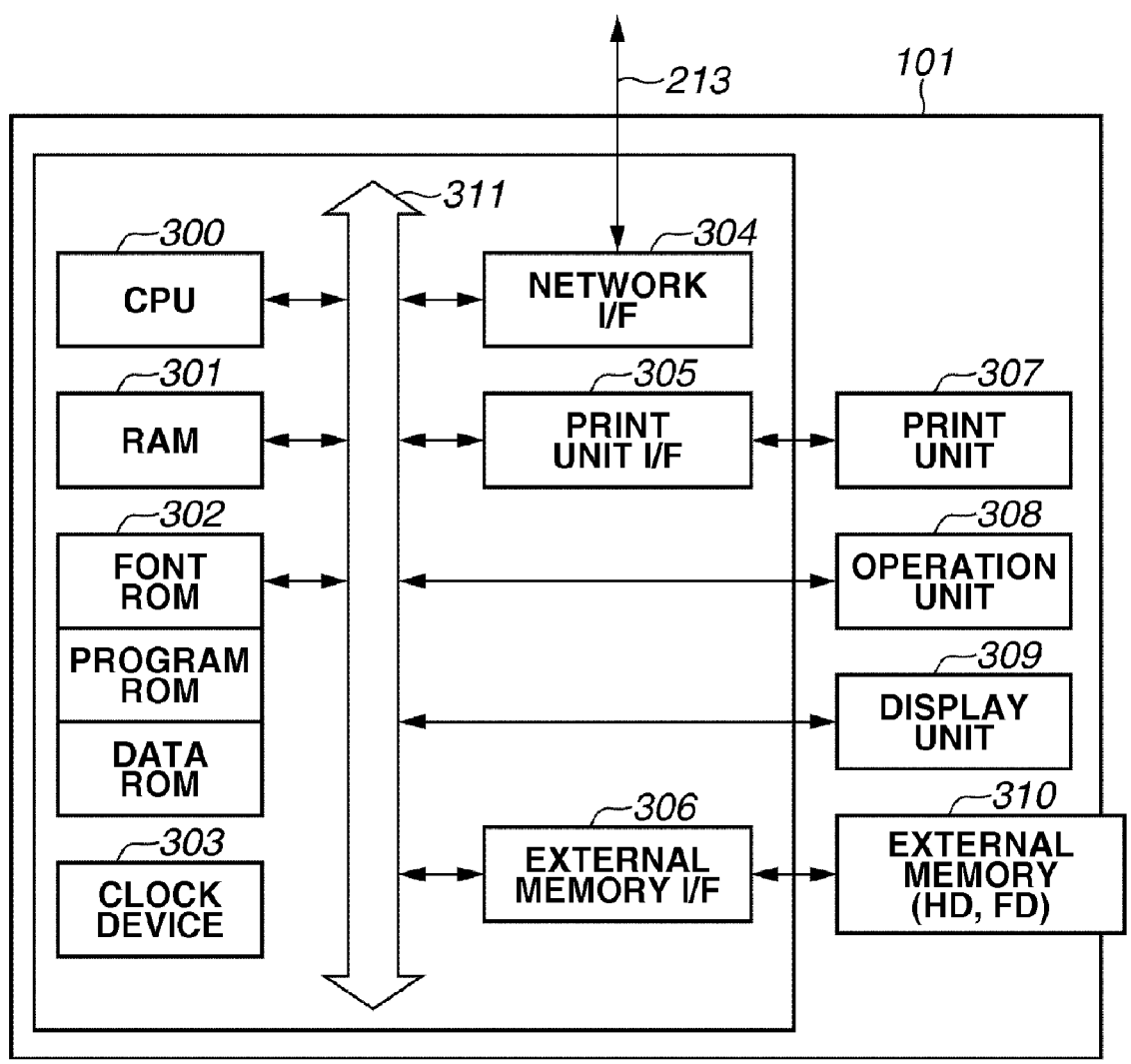
FIG. 3 is a block diagram illustrating a hardware configuration of an image forming apparatus.

FIG. 3 is a diagram illustrating a hardware configuration of the image forming apparatus 101 for providing a service to the client PC. FIG. 3 illustrates an example where a print device is the image forming apparatus 101. When a scanner is the image forming apparatus 101, instead of a print unit, the scanner unit is provided. When a copy machine is the image forming apparatus 101, the scanner unit and the print unit are provided therein. When a facsimile device is the image forming apparatus 101, a facsimile unit is provided therein.

A CPU 300 controls each unit based on a control program stored in a program ROM of a ROM 302 or a control program stored in an external memory 310. For example, the CPU 300 outputs an image signal as output information to a print unit (printer engine) 307 via a print unit interface I/F 304 connected to the system bus 311.

Further, the program ROM of the ROM 302 stores the control program for the CPU 300. A font ROM of the ROM 302 stores font data that is used when the output information as described above is generated. When the print device does not include the external memory 310 such as the hard disk, the data ROM of the ROM 302 stores information used for the client PC.

The image forming apparatus 101 is connected to the LAN 213 via the network I/F 304 and can communicate with the client PC so that the information in the image forming apparatus can be transmitted to the DP 100. A RAM 301 functions as a main memory and a work area of a CPU 1000 and its memory capacity can be expanded by an option RAM to be connected to an additional port (not illustrated).

The RAM 301 is used as a region where the output information is developed, or a region where environment data is stored, and may be a non-volatile RAM (NVRAM). A display unit 309 displays the predetermined information to notify a user utilizing a print service of various information.

The external memory I/F 306 controls access to the external memory 310 such as the HD and an integrated circuit (IC) card as described above. The external memory 310 is connected as an option and stores font data, an emulation program and form data.

Further, an operation unit 308 is provided with a switch and a light emitting diode (LED) that are operated by the user via an operation panel. Further, the external memory as described above is not limited to one but at least one or more external memories are provided and may be configured to further connect a plurality of external memories.

In addition to a built-in font, the external memory stores an optional font card, a program for interpreting a print device control language having a different language system. Further, the external memory may include the NVRAM (not illustrated) and store a mode setting information input from the operation panel 308.

Furthermore, a clock device 303 is used when it is examined whether a date of a certificate is expired. As the clock device 303, a similar clock function may be provided in the ROM 302 or outside the print device.

Figure 4:
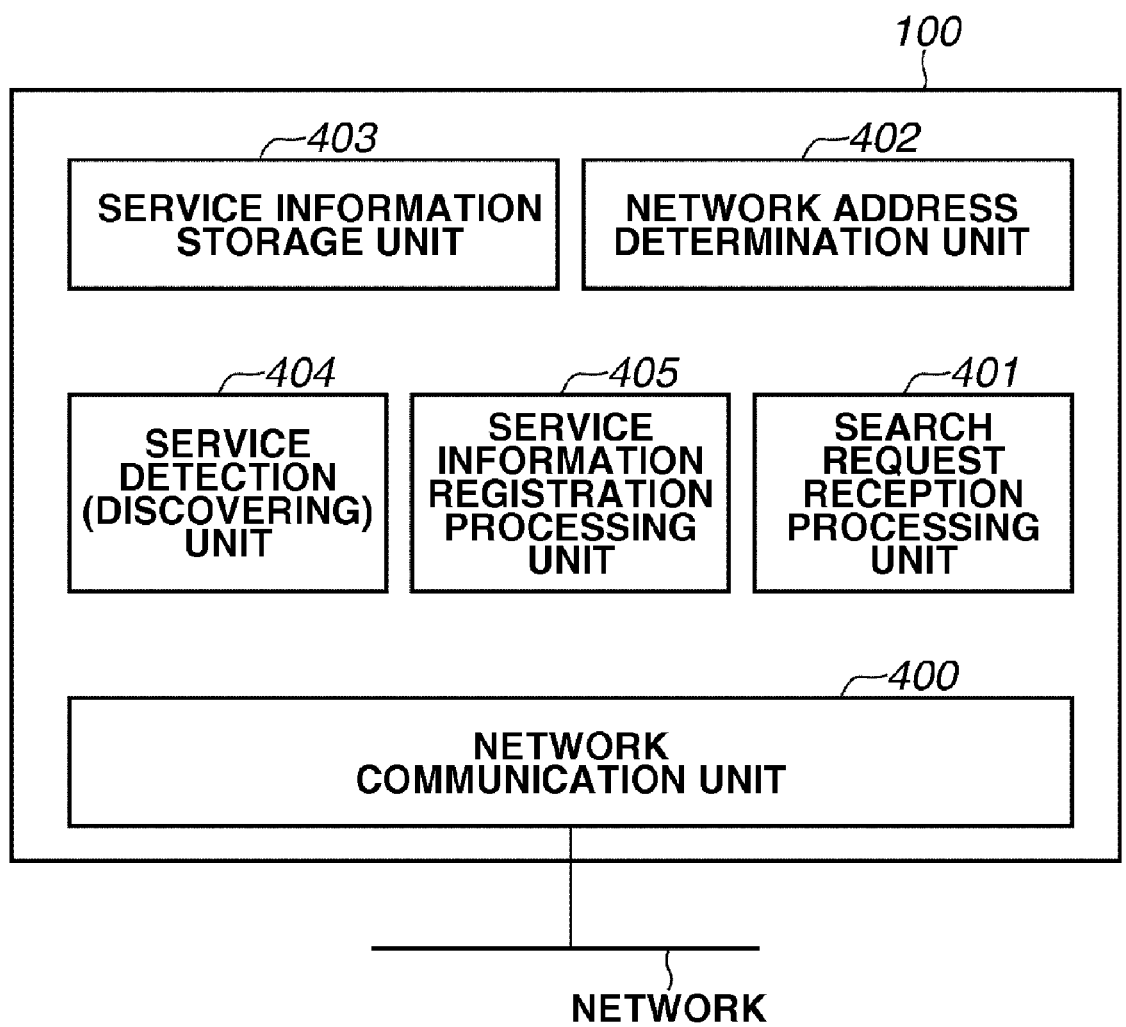
FIG. 4 is a diagram illustrating a module configuration inside a system of the DP.

FIG. 4 is an example of a diagram illustrating a module configuration inside a system of the DP 100. The DPs 107 and 111 as illustrated in FIG. 1 have similar configurations. The DP system includes a network communication unit 400 and a service detection unit 404 for detecting a service in the network by using the network communication unit 400.

According to the present exemplary embodiment, the service means a function provided by the image forming apparatus. In other words, when the print device is included as the image forming apparatus, a print service is provided. More specifically, detecting the service in the network is equivalent to detecting the image forming apparatus that provides the service. Searching for the service is equivalent to searching for the image forming apparatus (device) that provides the service.

When the service detection unit 404 detects (discovers) a new service, the DP registers the service in a service-information storage unit 403. Information registered in the service-information storage unit 403 includes a type of the service (a print service, a scan service, a copy service, etc.) and a network address of the image forming apparatus that provides the service.

To detect the service, the image forming apparatus providing the service receives a service start notification issued on the network when the service is started (usually, at the time of starting up).

The service start notification is, for example, a Hello message of a web services dynamic discovery (WS-Discovery) as illustrated in FIG. 7. Or, a start up message of a simple service discovery protocol (SSDP).

Further, the service detection unit 404 detects an end of the service. When the end of the service is detected, the DP deletes the information of the service registered in the service-information storage unit 403. The end of the service is detected when, for example, a bye message of the WE-Discovery as illustrated in FIG. 8 or an end message of the SSDP is received.

When a service information registration request is received via the network, a service-information registration processing unit 405 performs processing for registering the service information in the service-information storage unit 403. A search-request reception processing unit 401 performs processing on a search request received by the network communication unit 400. The search request is transmitted from the client PC in the network and includes a condition for searching a desired service.

A specific example of the search request will be described below in detail with reference to FIG. 9. The search-request reception processing unit 401 acquires a network address of the client PC that has transmitted the search request and notifies the network address to a network-address determination unit 402.

Further, the search-request reception processing unit 401 extracts the search condition included in the search request and extracts the service information satisfying the search condition from the service-information storage unit 403. Furthermore, the search-request reception processing unit 401 acquires from the service-information storage unit 403 the network address of the image forming apparatus that provides the service corresponding to the extracted service information. The network address determination unit is notified of the acquired network address.

The network-address determination unit 402 compares the network addresses notified from the search-request reception processing unit 401. More specifically, the network-address determination unit 402 compares the network address of the client PC that has transmitted the search request with the network address of the image forming apparatus providing the service that satisfies the search condition.

When the network address of the image forming apparatus is a link local address and the client PC and the image forming apparatus exist in different subnetworks, the network-address determination unit 402 notifies the search-request reception processing unit 401 that the network address of the image forming apparatus is a link local address and the client PC and the image forming apparatus exist in different subnets. In this case, the client PC cannot access the image forming apparatus.

When the network address of the image forming apparatus is not a link local address and the client PC and the image forming apparatus exist in a same subnetwork, the network-address determination unit 402 notifies the search-request reception processing unit 401 to that effect. In this case, the client PC can access the image forming apparatus.

The search-request reception processing unit 401 generates a response to the search request based on a result notified by the network-address determination unit 402 and transmits the response to the client PC that has requested the search. A specific example of the response to the search request will be described below with reference to FIG. 10. With this response, the service provided by the accessible image forming apparatus is transmitted as the search result to the client PC that has requested the search.

Figure 5:
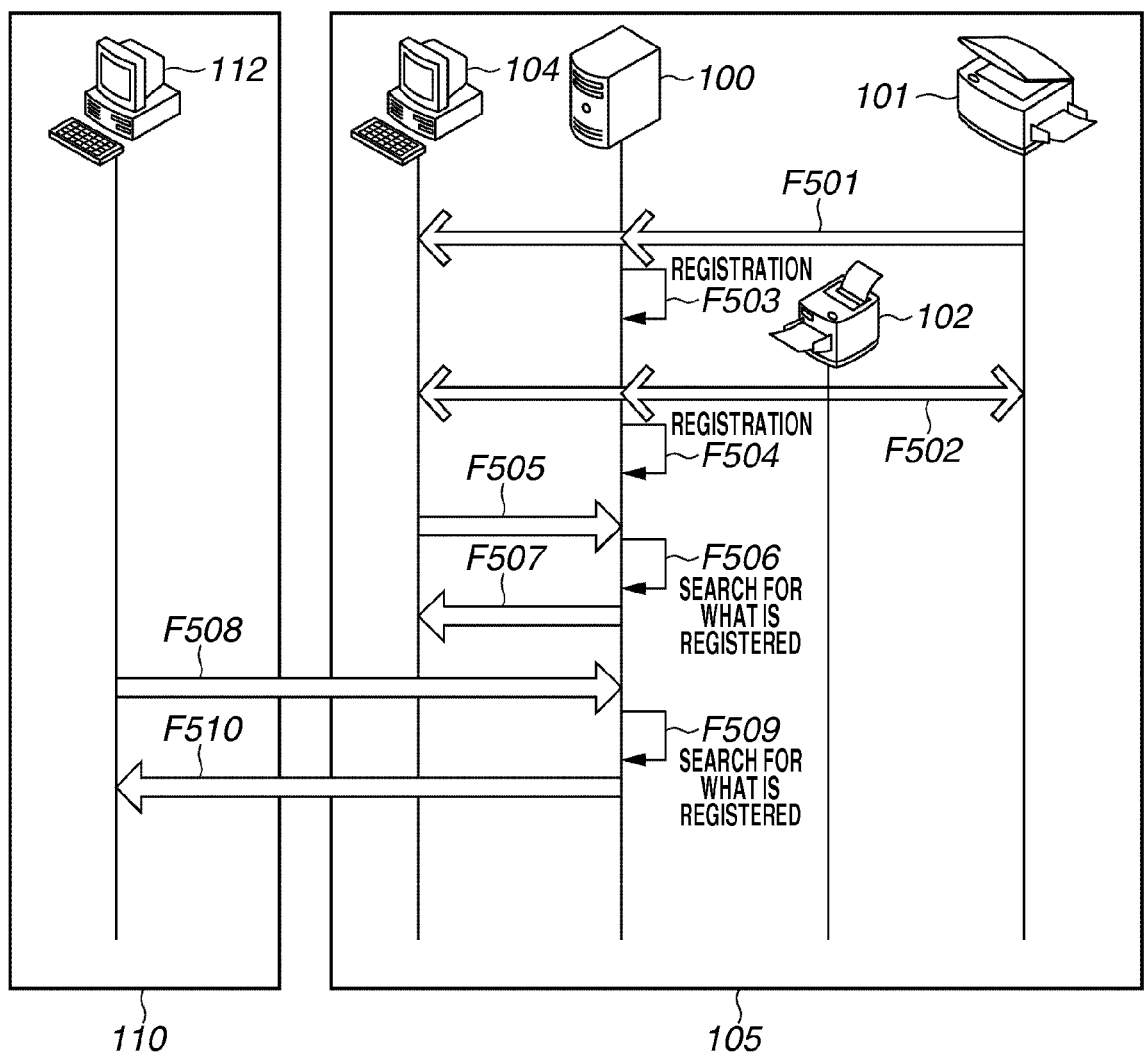
FIG. 5 is a sequence diagram illustrating a flow of service search processing.

FIG. 5 is a sequence diagram illustrating a flowchart for searching the service provided by the image forming apparatus.

Upon starting the service (usually at the time of activating), the image forming apparatuses 101 and 102 providing the service to the client PC notifies the networks of the service that they provide (F501, F502).

In the DP 100, the service detection unit 404 detects this notification. The service-information registration processing unit 405 registers the service information and the network address of the image forming apparatus that are detected, in the service-information storage unit 403 (F503, F504).

The client PC 104 transmits the search request to the DP 100 to search for the desired service (F505).

When the DP 100 receives the search request, the search-request reception processing unit 401 searches the service based on the information registered in the service-information storage unit 403 (F506) and transmits the search result to the client PC 104 (F507).

The above system according to the present invention will be described more specifically. The client PC 104, the DP 100, and the image forming apparatuses 101 and 102 exist in the subnetwork 105. The image forming apparatus 102 has an IP address effective only in the subnetwork 105. The client PC 112 exists in the subnetwork 110.

The IP address effective only in the subnetwork 105 is a link local address such as the IPv4 and the Ipv6. In the present description, it is supposed that the image forming apparatuses 101 and 102 satisfy the search condition of the search request transmitted from the client PC.

In this state, when the image forming apparatuses 101 and 102 start the service, the service information of the image forming apparatuses 101 and 102 is registered in the service-information storage unit 403 of the DP 100.

When the search request of the service is transmitted from the client PC 112 to the DP 100, the network addresses of both image forming apparatuses 101 and 102 are transmitted as the search result according to the conventional method.

Thereafter, even when the client PC 112 attempts to use the image forming apparatus 102, the client PC 112 cannot communicate with the image forming apparatus 102, since the network address of the image forming apparatus 102, which is sent in response as the search result, is only effective within the subnetwork 105.

On the other hand, according to the present exemplary embodiment, in response to the search request transmitted from the client PC 112, the DP 100 sends only the network address of the image forming apparatus 101 in response as the search result. That is because, the network-address determination unit 402 of the DP 100 determines that the client PC 112 and the image forming apparatus 102 exist in the different subnetworks and thus cannot communicate with each other.

As a result, the client PC 112 is notified of only the image forming apparatus 101 that is available, thereby skipping a useless search result and improving an accuracy of the search.

Figure 6:
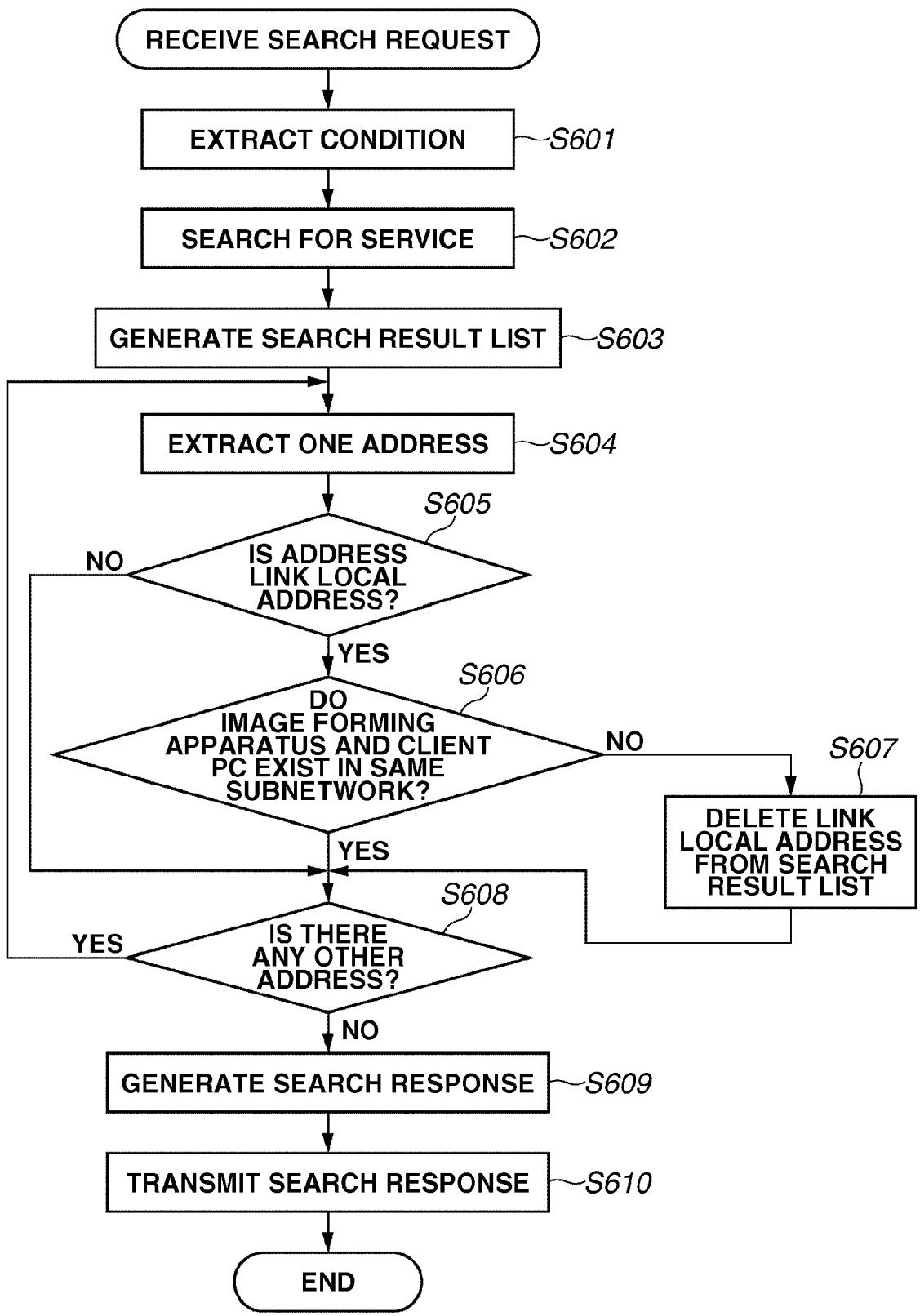
FIG. 6 is a flowchart illustrating the service search processing of the DP.

FIG. 6 is a flowchart illustrating the service search processing of the DP according to the present exemplary embodiment. In each step as illustrated in FIG. 6, the CPU 201 of the DP executes a program stored in the ROM 202 to perform the processing.

The flow of FIG. 6 starts when the network communication unit 400 of the DP receives the search request transmitted from the client PC. The client PC transmits to the DP a Probe message in an extensible markup language (XML) format as illustrated in FIG. 9 via a unicast.

The Probe message as illustrated in FIG. 9 is one example of the search requests. In the Probe message of FIG. 9, a <Probe> tag exists in a body part to illustrate that this message is the Probe message. A <Types> tag exists in the <Probe> tag.

The <Types> tag specifies a type of the device to be searched and represents the search condition. The example of FIG. 9 illustrates the Probe message for searching for the device type of the printer.

In step S601, the search-request reception processing unit 401 extracts the search condition included in the received search request. The example of FIG. 9 extracts the Printer described in the <Types> tag.

In step S602, the search-request reception processing unit 401 searches for the service corresponding to the extracted condition from among the service-information storage unit 403. When the search request of FIG. 9 is received, the print service is searched. In step S603, the search-request reception processing unit 401 generates a search result list based on the searched service information.

The search result list includes the network address of the image forming apparatus providing the service that satisfies the search condition. The search-request reception processing unit 401 notifies the network-address determination unit 402 of the generated search result list and the network address of the client PC that has transmitted the search request.

In step S604, the network-address determination unit 402 extracts one network address from among the notified search result list. In step S605, the network-address determination unit 402 determines whether the extracted network address is the link local address.

More specifically, when the network address is the IPv4 address, the network-address determination unit 402 determines whether the address is within a range of 169. 254. 0. 0 to 169. 254. 255. 255. When the network address is the IPv6 address, the network-address determination unit 402 determines whether the address is within a range of FE80::/10.

When it is determined that the network address is the link local address (YES in step S605), the processing proceeds to step S606. When it is determined that the network address is not the link local address (NO in step S605), the processing proceeds to step S608. In step S606, the network-address determination unit 402 determines whether the image forming apparatus having the address extracted in step S604 and the client PC that has transmitted the search request exist in the same subnetwork.

This determination is performed by comparing the network addresses. For example, in a state where the IP address extracted in step S604 is "172. 24. 160. 232" and the subnetwork mask is set as "255. 255. 252. 0", "172. 24. 160. 0" is the information for specifying the subnetwork.

In contrast, when the IP address of the client PC is for example, "172. 24. 177. 42", the information for specifying the subnetwork is "172. 24. 177. 0". Since the two addresses are different, it is determined that the two addresses do not exist in the same subnetwork.

On the other hand, when the IP address of the client PC is, for example, "172. 24. 160. 220", the information for specifying the subnetwork is "172. 24. 160. 0". Since the two addresses are the same, it is determined that the two addresses exist in the same subnetwork.

When the network address is the IPv6 address, the addresses are determined depending on whether the network address parts of the IPv6 address are the same. In step S606, when it is determined that the addresses exist in the same subnetwork (YES in step S606), the process proceeds to step S608. When it is determined that the addresses do not exist in the same subnetwork (NO in step S606), the process proceeds to step S607.

In step S607, the network-address determination unit 402 deletes the network address extracted in step S604 from the search result list.

As a result, the address of the image forming apparatus which the client PC cannot access is deleted from the search result list. In step S608, the network-address determination unit 402 refers to the search result list and determines whether all addresses on the list are extracted.

When there is still any address left that is not extracted (YES in step S608), the processing returns to step S604. When all addresses on the search result list are extracted (NO in step S608), the network-address determination unit 402 notifies the search-request reception processing unit 401 of the search result lists. Here, the search result list to be notified does not include the address of the image forming apparatus which the client PC cannot access.

In step S609, the search-request reception processing unit 401 generates the search response to the search request based on the search result list notified from the network-address determination unit 402. FIG. 10 illustrates the ProveMatch message that is one example of the search responses generated in step S609.

In the ProbeMatch message of FIG. 10, the <ProbeMatches> tag exists in the body part and illustrates that this message is the ProbeMatch message. In the <ProbeMatch> tag, ProbeMatch parts 1001 and 1002 illustrated by the <ProbeMatch> tag exist.

Each ProbeMath part corresponds to one search result. An example of FIG. 10 illustrates the search result illustrating that two image forming apparatuses correspond to Printer that is the search condition. In step S610, a network communication unit transmits the search response generated in step S609 to the client PC that has transmitted the search request.

FIG. 7 is an example of a Hello message of the WS-Discovery. The Hello message notifies other terminals in the network of a start of the service and is transmitted when the service is started. Usually, the Hello message is transmitted when the image forming apparatus is activated.

Upon receiving the Hello message, the DP registers the information in the service-information storage unit 403 thereof and sends the registered information in response to the search.

The Hello message includes a header part 701 enclosed by <Header> tags and a body part 702 enclosed by <Body> tags. The whole part of the Hello message is enclosed by <Envelope> tags. This configuration is common in all messages used in the present exemplary embodiment.

The header part 701 plays a role of a common header independent from a content of the message and includes an <Action> tag, a <Message ID> tag, and a <To> tag. The <Action> tag identifies a type of the message.

The <MessageID> tag is an identifier to uniquely identify the message. The <To> tag identifies a message destination. The body part 702 changes its configuration corresponding to the content of the message. In FIG. 7, the <Hello> tag exists just below the <Body> tag and indicates that the message is the Hello message.

The <Hello> tag includes an <EndpointReference> tag, the <Types> tag, an <XAddrs> tag, and a <MetadataVersion> tag. The <EndpointReference> tag includes an <Address> tag, which describes address information for identifying the device.

The <Types> tag describes type information of the device. According to the present exemplary embodiment, the type information of the device describes the print device. The <XAddrs> tag describes a uniform resource locator (URL) for acquiring the device information. The <MetadataVersion> tag describes a version of the device information.

FIG. 8 is an example of the Bye messages of the WS-Discovery. The Bye message notifies other terminals in the network when the service for providing in the network is stopped. Usually, the Bye message is transmitted when the power of the image forming apparatus is turned off.

Upon receiving the Bye message, the DP deletes the service information having the specified ID from the service-information storage unit 403 of the PD. The Bye message includes the <Bye> tag in the body part, which describes that this message is the Bye message.

The <Bye> tag includes an <Endpoint Reference> tag, which includes the <Address> tag and has the address information for identifying the device.

As described above, according to the present exemplary embodiment, when the client PC transmits the search request to the DP, the search result does not include the image forming apparatus which the client PC cannot access. As a result, the accuracy of the device search can be drastically improved than ever before.

In the service search processing as described in FIG. 6, the network-address determination unit 402 of the DP makes a determination for each address of the image forming apparatuses satisfying the search condition. However, the network-address determination unit 402 may determine whether the DP and the client PC that has transmitted the search request exist in the same subnetwork.

When the DP and the client PC that has transmitted the search request exist in the same subnetwork, the addresses of all image forming apparatuses satisfying the search condition are transmitted as the search response. On the other hand, when the DP and the client PC that has transmitted the search request do not exist in the same subnetwork, from among the addresses of the image forming apparatuses satisfying the search condition, the address other than the link local address is transmitted as the search response.

If the service-information storage unit 403 is controlled such that the link local address of the image forming apparatus that does not exist in the same subnetwork is not registered, this method can also achieve the similar effects as described above.

Further, in the service search processing as described above in FIG. 6, the DP searches the service information held in the service-information storage unit 403, for the service satisfying the search condition. Thereafter, the DP determines the address of the image forming apparatus corresponding to the service satisfying the search condition.

However, the address of the image forming apparatus for all service information held in the service-information storage unit 403 may be firstly determined. More specifically, it may be firstly determined whether the address of the image forming apparatus is the link local address, and whether the image forming apparatus and the client PC exist in the same subnetwork. And, from among the image forming apparatuses that have no link local addresses or exist in the same subnetwork as the client PC, the image forming apparatuses satisfying the search condition may be searched.

According to the first exemplary embodiment, the search result to be sent as response is sorted out when the service is searched so that the search result does not include the image forming apparatus which the client PC cannot access.

A second exemplary embodiment describes examples in which the service information held by the DP is registered in other DP or the image forming apparatus registers the service information thereof in the DP.

According to the present exemplary embodiment, when the service information is registered in the DP, control is performed to register useless information as less as possible. The second exemplary embodiment will be described below.

Since the system configuration and a hardware configuration of each apparatus are similar to the first exemplary embodiment, the description will be omitted.

Figure 11:
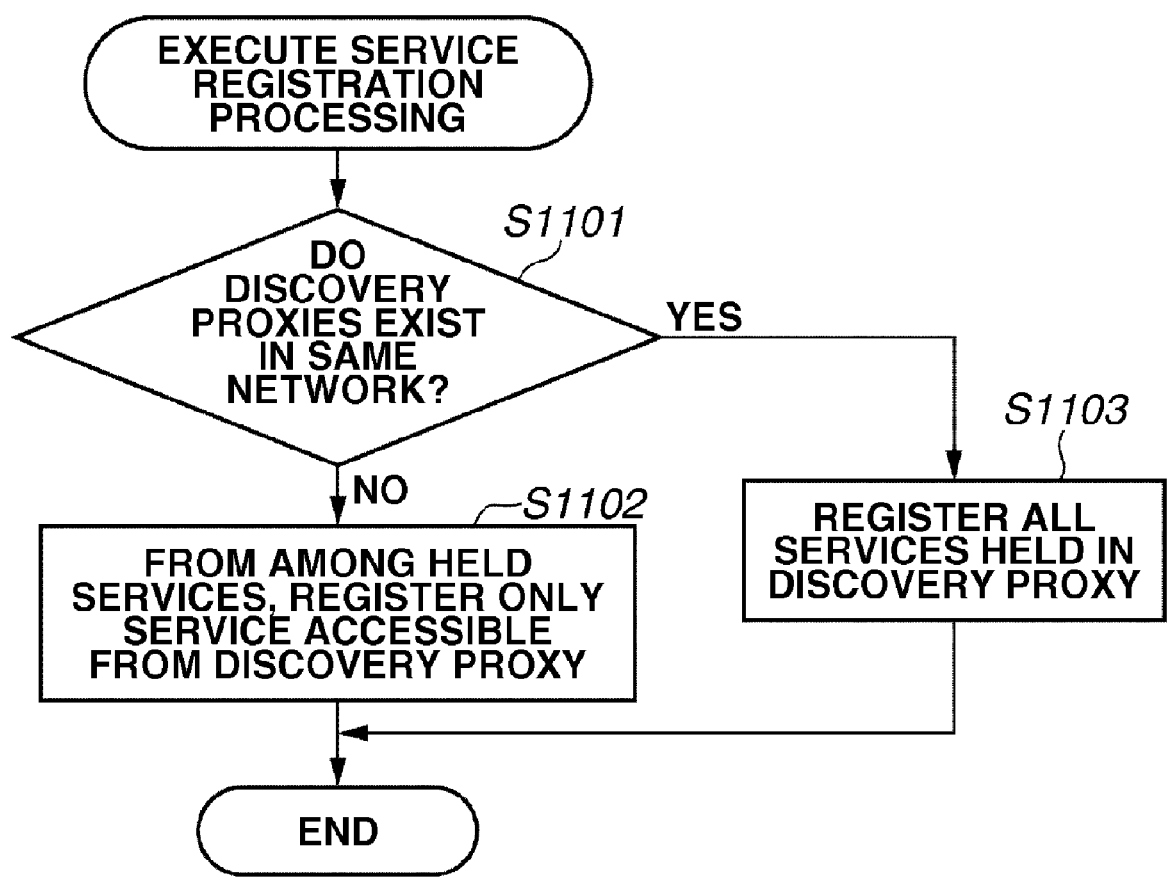
FIG. 11 is a flowchart illustrating processing performed in an apparatus which registers a service in the DP according to a second exemplary embodiment.

FIG. 11 is a flowchart illustrating processing performed in the apparatus in which the DP registers the service. The apparatus for registering the service in the DP includes, for example, the image forming apparatus and other DP.

The other DP registers the service in the DP to synchronize the information held in the service-information storage unit 403 among a plurality of DPs.

The flowchart of FIG. 11 illustrates an operation of the other DP when the other DP registers the information in the DP. More specifically, an example of FIG. 1 illustrates an operation of the DP 100 when the DP 100 registers the service information in the DP 107.

The service information registered in the service-information storage unit 403 of the DP 100 is transmitted from the DP 100 to the DP 107. Hereafter, the DP transmitting the service information to the other DP is referred to as the transmitting DP.

Further, the DP that receives the service information transmitted from the other DP and registers the service information in the 403 thereof is referred to as the destination DP.

The flowchart of FIG. 11 starts when the transmitting DP issues an instruction for a registration of the service information. The registration instruction is generated when a user inputs an address of the transmitting DP by using the operation unit provided in the DP. Alternatively, the address of the destination DP may be previously set in the transmitting DP and the registration processing of the service information may be performed at a predetermined time or periodically.

In step S1101, the transmitting DP compares the network address thereof with the network address of the destination DP. And the transmitting DP determines whether the destination DP and itself (the transmitting DP) exist in the same subnetwork.

The method described in the first exemplary embodiment may be used as a specific determination method. When it is determined that the transmitting DP and the destination DP exist in the same subnetwork (YES in step S1101), the processing proceeds to step S1103. When it is determined that transmitting DP and the destination DP do not exist in the same subnetwork (NO in step S1101), the processing proceeds to step S1102.

In step S1103, the transmitting DP transmits all service information held in the service-information storage unit 403 to the destination DP. The service information to be transmitted includes at least a content of the service and the address of the image forming apparatus providing the service.

In step S1102, the transmitting DP extracts the service provided by the image forming apparatus having the link local address from among the service information held in the service-information storage unit 403.

Further, from among the service information held in the service-information storage unit 403, the service information from which the extracted service information is excluded, is transmitted to the destination DP. The service information transmitted here includes at least the content of the service and the address of the image forming apparatus providing the service, which does not include the link local address.

FIG. 11 illustrates an example in which the DP registers the service information in the other DP. However, when the image forming apparatus registers the service information in the DP, the similar method may be used. In this case, in step S1101, when it is determined that the image forming apparatus and the DP do not exist in the same subnetwork (NO in step S1101), in step S1102, the service information is not transmitted.

In the example of FIG. 11, the device for transmitting the service information to the DP extracts and transmits only necessary service information. However, the DP receiving the service information may be controlled to extract and register only necessary service information.

Figure 12:
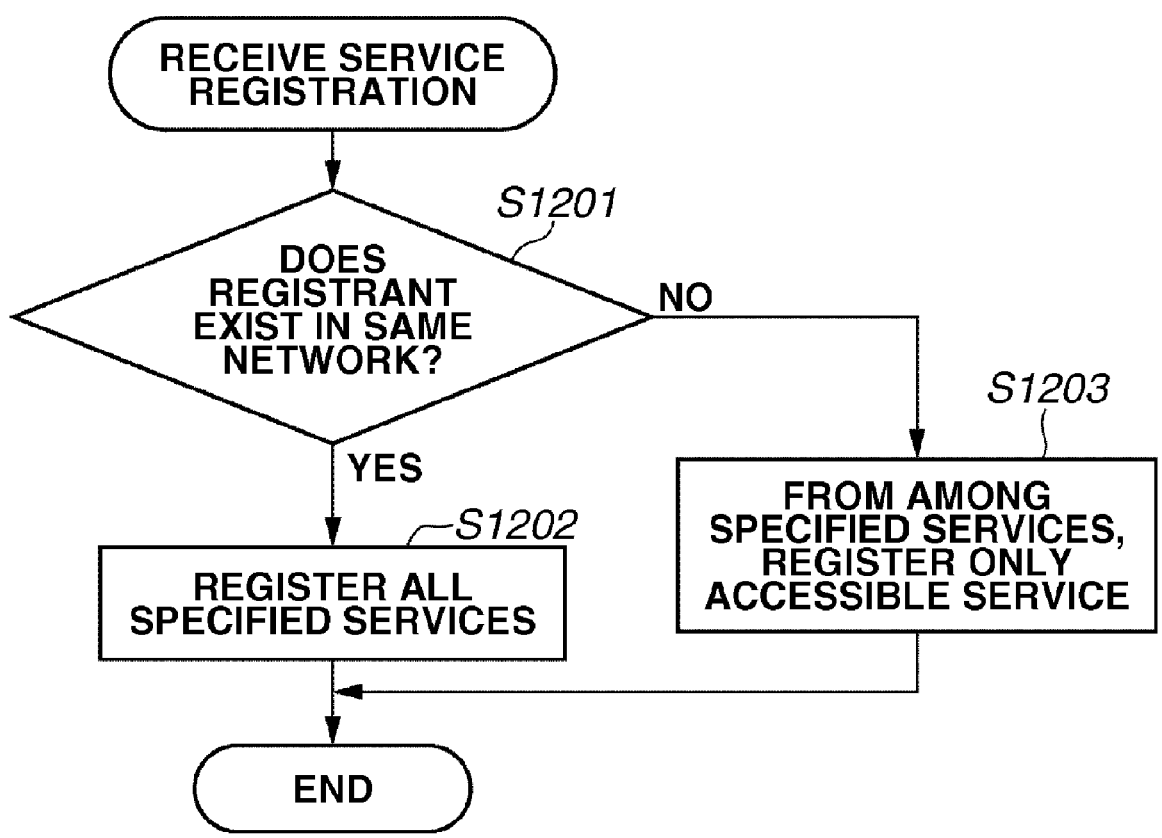
FIG. 12 is a flowchart illustrating an operation of the DP according to the second exemplary embodiment.

FIG. 12 is a flowchart illustrating an operation of the DP receiving the service information in the above described case. In other words, the flowchart illustrates the operation of the destination DP. A flow of FIG. 12 starts when the destination DP receives the service information transmitted from the transmitting DP or the image forming apparatus.

In step S1201, the destination DP compares the network address of the device transmitting the service information received by the destination DP, with the network address of the DP. And, the destination DP determines whether the device transmitting the service information and itself (the destination DP) exist in the same subnetwork.

The method described in the first exemplary embodiment may be used as the specific determination method. When it is determined that the transmitting DP and the destination DP exist in the same subnetwork (YES in step S1201), the processing proceeds to step S1202. When it is determined that the transmitting DP and the destination DP do not exist in the same subnetwork (NO in step S1201), the processing proceeds to step S1203. In step S1202, the destination DP registers the received service information in the service-information storage unit 403 thereof.

In step S1203, the destination DP extracts the service provided by the image forming apparatus having the link local address from among the received service information. From among the received service information, the destination DP registers the service information from which the extracted service information is excluded, in the service information storage unit 403.

As described above, according to the present exemplary embodiment, the image forming apparatus that exists in the subnetwork different from the DP and has the link local address can be prevented from being registered in the DP.

Accordingly, the DP does not respond to the search request transmitted from the client PC with respect to the image forming apparatus that exists in the different subnetwork and has the link local address. As a result, the search response does not include unnecessary information, thereby improving the accuracy of the device search.

According to the second exemplary embodiment, the DP selects the search result to be sent as response so that the search result does not include the image forming apparatus which the client PC cannot access. According to a third exemplary embodiment, the client PC receiving the search result performs control so that the image forming apparatus which the client PC itself cannot access, is not displayed.

Thus, the user operating the client PC can be prevented from selecting the image forming apparatus which the client PC cannot access. The third exemplary embodiment will be described below.

Since the system configuration and the hardware configuration of each device are similar to the first exemplary embodiment, the description will be omitted.

Figure 13:
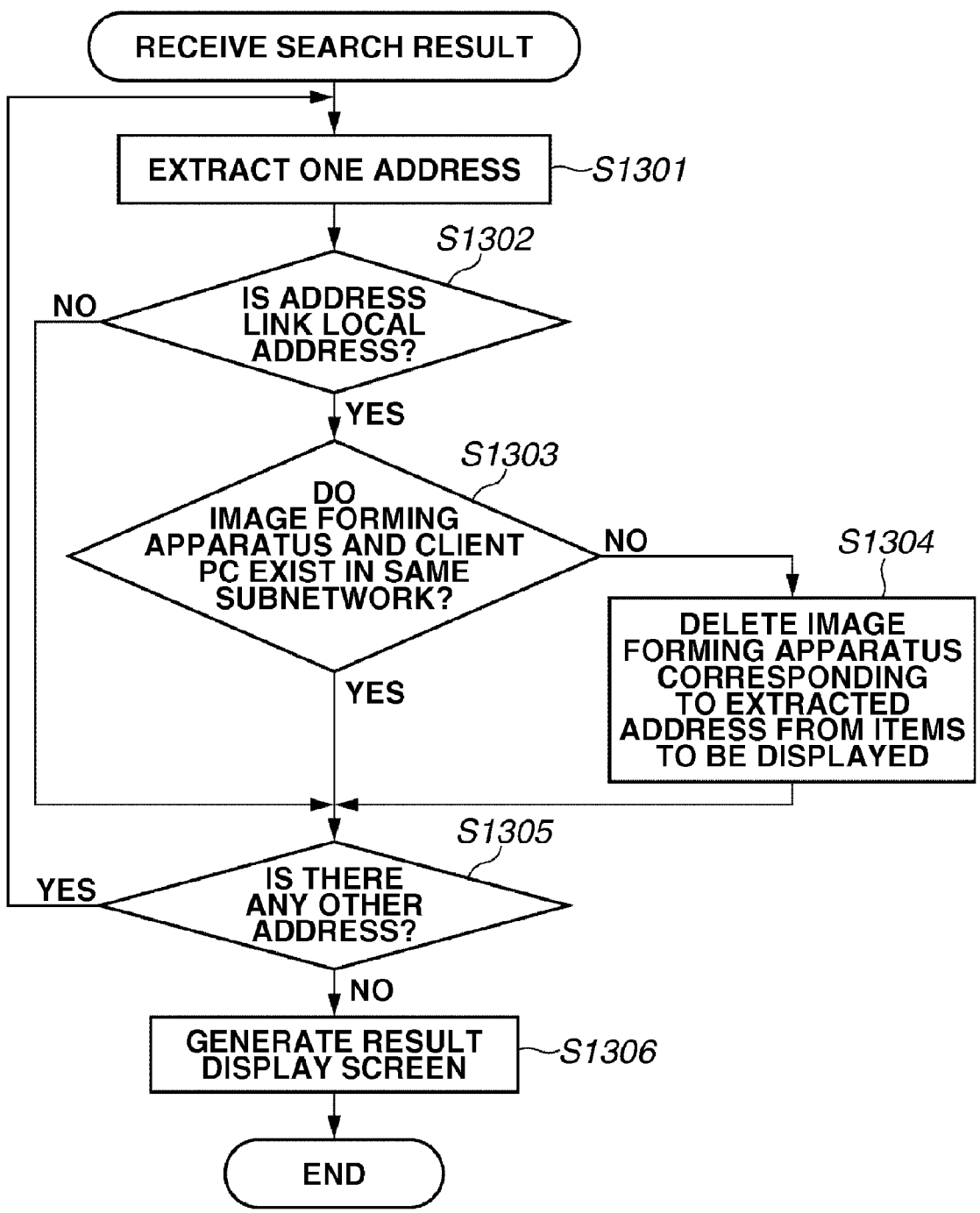
FIG. 13 is a flowchart illustrating processing when a search result performed in the client PC is displayed according to a third exemplary embodiment.

FIG. 13 is a flowchart illustrating the processing when the search result performed in the client PC is displayed. The CPU 201 provided in the client PC executes a program stored in the ROM 202 to perform each step in FIG. 13.

A flow of FIG. 13 starts when the client PC that has transmitted the search request to the DP receives the research response from the DP.

In step S1301, the CPU of the client PC extracts one address of the image forming apparatus included in the received search response. In step S1302, the CPU of the client PC determines whether the extracted address is the link local address.

The method described in FIG. 6 of the first exemplary embodiment may be used as the specific determination method. When it is determined that the address of the image forming apparatus is the link local address (YES in step S1302), the processing proceeds to step S1303. When it is determined that that the address of the image forming apparatus is not the link local address (NO in step S1302), the processing proceeds to step S1305.

In step S1303, the CPU of the client PC determines whether the image forming apparatus corresponding to the extracted address and the client PC itself exist in the same subnetwork. The determination is made by comparing the network address of the image forming apparatus with the network address of the client PC.

The method described in the FIG. 6 of the first exemplary embodiment may be used as the specific method. As a result of the determination, when it is determined that the addresses exist in the same subnetwork (YES in step S1303), the processing proceeds to step S1305. When it is determined that the addresses exist in the different subnetworks (NO in step S1303), the processing proceeds to step S1304.

In step S1304, the CPU of the client PC deletes the image forming apparatus corresponding to the extracted address in step S1301 from the items of the search result to be displayed.

In step S1305, the CPU of the client PC determines whether the received result response includes any other address. When it is determined that other address is included (YES in step S1305), the processing returns to step S1301. When it is determined that other address is not included (NO in step S1305), the processing proceeds to step S1306.

In step S1306, the CPU of the client PC extracts the image forming apparatus to be displayed from the received result response and, based on the information of the image forming apparatus, generates the display screen of the search result. The CRTC 206 of the client PC causes the CRT 210 to display the search result display screen.

Figure 14:
FIG. 14 is an example of a display screen of the search result displayed on a cathode-ray tube (CRT) of the client PC.

FIG. 14 is one example of the display screen of the search result displayed on the CRT 210 of the client PC. In the example of FIG. 14, in a region 1403 on the screen, two printers are displayed as the search result.

A button 1401 is used to specify the search condition when an instruction for the search is given, and can specify a keyword such as "scanner" and "printer" (not illustrated). Further, a button 1402 is used to give an instruction for a search execution. When the button 1402 is pressed down while the button 1401 specifies the search condition, the search request is transmitted to the DP based on the condition.

As described above, according to the present exemplary embodiment, since the image forming apparatus which the client PC cannot access is not displayed as the search result, the user can be prevented from selecting the image forming apparatus, thereby improving the accuracy of the device search than ever before.

In the display processing of the search result described in FIG. 13, the client PC performs determination for each address of the image forming apparatuses included in the result response. On the other hand, it may be determined whether the DP performing the search and the client PC transmitting the search request exist in the same subnetwork.

When the DP and the client PC exist in the same subnetwork, the addresses of all image forming apparatuses satisfying the search condition are displayed as the search result. On the other hand, when the DP and the client PC do not exist in the same subnetwork, from among the address of the image forming apparatuses satisfying the search condition, the address other than the link local address is displayed as the search result.

If the DP is controlled so that the link local address of the image forming apparatus that does not exist in the same subnetwork is not registered, this method can achieve the similar effect to that described above.

According to the exemplary embodiment as described above, the image forming apparatus, the DP, and the client PC are described as an individual apparatus, however, they may also be provided as one apparatus. More specifically, for example in FIG. 1, the image forming apparatus such as the image forming apparatus 101 or the image forming apparatus 102 may have the function of the DP 100.

Similarly, the client PC may have the function of the DP in the above exemplary embodiment. Alternately, the image forming apparatus and the client PC in the exemplary embodiment may be provided as one apparatus.

Further, according to the present invention, a storage medium storing a compute program code of a software that realizes a flowchart of the exemplary embodiment as described above may be supplied to the system or the apparatus. The computer (CPU or micro processing unit (MPU)) of the system or the apparatus reads out and executes the program code stored in the storage medium to realize the present invention.

In this case, the program code itself read out from the storage medium realizes the function of the exemplary embodiment, thus, the storage medium storing the program code constitutes the present invention.

The storage medium for supplying the program code includes, for example, a floppy disk, a hard disk, an optical disk, an optical magnetic disk, a compact disk-read only memory (CD-ROM), a CD-recordable (CD-R), a digital versatile disc-ROM (DVD-ROM), a magnetic tape, non-volatile memory, and a ROM.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-136682 filed May 26, 2008, which is hereby incorporated by reference herein in its entirety.

What is claimed is:

1. An information processing apparatus that is capable of connecting to a plurality of image forming apparatuses, comprising: a processor and memory; a storage unit adapted to store addresses of the plurality of image forming apparatuses; a reception unit adapted to receive from an external apparatus a request to acquire the address stored by the storage unit; a determination unit adapted to, based on the address by the storage unit and an address of the external apparatus, determine whether each of the addresses stored by the storage unit is an address which is able to be accessed from the external apparatus; and a transmission unit adapted to transmit, to the external apparatus, at least one address determined as being able to be accessed from the external apparatus by the determination unit, wherein the determination unit determines whether the address of the image forming apparatus stored by the storage unit is a link local address, and, when the address of the image forming apparatus is the link local address, determines whether the image forming apparatus and the external apparatus exist in a same subnetwork, so as to determine whether the image forming apparatus has the address which the external apparatus is able to access.

2. The information processing apparatus according to claim 1, wherein the image forming apparatuses whose information is transmitted by the transmission unit do not include an image forming apparatus that is not determined by the determination unit to have an address which the external apparatus is able to access.

3. The information processing apparatus according to claim 1, wherein the address of the image forming apparatus and the address of the external apparatus are an IP address.

4. An information processing apparatus that is capable of connecting to a plurality of image forming apparatuses, comprising:
a processor and memory;
a storage unit adapted to store addresses of the plurality of image forming apparatuses which exist in the same subnetwork as the information processing;
a transmission unit adapted to transmit to an external apparatus the address of the image forming apparatus stored by the storage unit; and
a determination unit adapted to determine whether the information processing apparatus and the external apparatus exist in a same subnetwork;
wherein the transmission unit transmits the addresses of the plurality of image forming apparatuses stored by the storage unit when the determination unit determines that the information processing apparatus and the external apparatus exist in the same subnetwork, and transmits the addresses excluding a link local address from among the addresses of the plurality of image forming apparatuses stored by the storage unit when the determination unit does not determine that the information processing apparatus and the external apparatus exist in the same subnetwork.

5. An information processing apparatus comprising:
a processor and memory;
a reception unit adapted to receive addresses of a plurality of image forming apparatuses transmitted from an external apparatus, the plurality of image forming apparatus existing in the same subnetwork as the external apparatus;
a determination unit adapted to determine whether the information processing apparatus and the external apparatus exist in a same subnetwork; and
a storage unit adapted to store the addresses of the plurality of image forming apparatus received by the reception unit when the determination unit determines that the information processing apparatus and the external apparatus exist in the same subnetwork, and store the addresses excluding a link local address from among the addresses of the plurality of image forming apparatuses received by the reception unit when the determination unit does not determine that the information processing apparatus and the external apparatus exist in the same subnetwork.

6. A method for controlling an information processing apparatus that is capable of connecting to a plurality of image forming apparatuses, comprising steps of:
storing addresses of the plurality of image forming apparatuses which exist in the same subnetwork as the information processing in a storage unit;
transmitting to an external apparatus the address of the image forming apparatus stored by the storage unit; and
determining whether the information processing apparatus and the external apparatus exist in a same subnetwork;
wherein the addresses of the plurality of image forming apparatuses stored by the storage unit are transmitted when it is determined that the information processing apparatus and the external apparatus exist in the same subnetwork, and the addresses excluding a link local address from among the addresses of the plurality of image forming apparatuses stored by the storage unit are transmitted when it is not determined that the information processing apparatus and the external apparatus exist in the same subnetwork.

7. A method for controlling an information processing apparatus comprising steps of:
receiving addresses of a plurality of image forming apparatuses transmitted from an external apparatus, the plurality of image forming apparatuses existing in the same subnetwork as the external apparatus;
determining whether the information processing apparatus and the external apparatus exist in a same subnetwork; and
storing the received addresses of the plurality of image forming apparatus in a storage unit when it is determined that the information processing apparatus and the external apparatus exist in the same subnetwork, and storing the addresses excluding a link local address from among the received addresses of the plurality of image forming apparatuses in the storage unit when it is not determined that the information processing apparatus and the external apparatus exist in the same subnetwork.

8. A non-transitory computer readable medium containing a program that causes an information processing apparatus that is capable of connecting to a plurality of image forming apparatuses to execute steps of:
storing addresses of the plurality of image forming apparatuses which exist in the same subnetwork as the information processing apparatus in a storage unit;
transmitting to an external apparatus the address of the image forming apparatus stored by the storage unit; and
determining whether the information processing apparatus and the external exist in a same subnetwork;
wherein the addresses of the plurality of image forming apparatuses stored by the storage unit are transmitted when it is determined that the information processing apparatus and the external apparatus exist in the same subnetwork, and the addresses excluding a link local address from among the addresses of the plurality of image forming apparatuses stored by the storage unit are transmitted when it is not determined that the information processing apparatus and the external apparatus exist in the same subnetwork.

9. A non-transitory computer readable medium containing a program that causes an information processing apparatus to execute steps of:

receiving addresses of a plurality of image forming apparatuses transmitted from an external apparatus, the plurality of image forming apparatuses existing in the same subnetwork as the external apparatus;

determining whether the information processing apparatus and the external apparatus exist in a same subnetwork; and storing the received addresses of the plurality of image forming apparatus in a storage unit when it is determined that the information processing apparatus and the external apparatus exist in the same subnetwork, and storing the addresses excluding a link local address from among the received addresses of the plurality of image forming apparatuses in the storage unit when it is not determined that the information processing apparatus and the external apparatus exist in the same subnetwork.

10. A method for controlling an information processing apparatus that is capable of connecting to a plurality of image forming apparatuses, the method comprising the steps of: storing addresses of the plurality of image forming apparatuses; receiving from an external apparatus a request to acquire the stored addresses; based on the stored addresses and an address of the external apparatus, determining whether each of the stored addresses is an address which is able to be accessed from the external apparatus; transmitting, to the external apparatus, at least one address determined as being able to be accessed from the external apparatus; and determining whether the stored address of the image forming apparatus stored is a link local address, and, when the address of the image forming apparatus is the link local address, determining whether the image forming apparatus and the external apparatus exist in a same subnetwork, so as to determine whether the image forming apparatus has the address which the external apparatus is able to access.

11. A non-transitory computer readable medium containing a program that causes an information processing apparatus to execute steps of: storing addresses of the plurality of image forming apparatuses; receiving from an external apparatus a request to acquire the stored addresses; based on the stored addresses and an address of the external apparatus, determining whether each of the stored addresses is an address which is able to be accessed from the external apparatus; transmitting, to the external apparatus, at least one address determined as being able to be accessed from the external apparatus; and determining whether the stored address of the image forming apparatus stored is a link local address, and, when the address of the image forming apparatus is the link local address, determining whether the image forming apparatus and the external apparatus exist in a same subnetwork, so as to determine whether the image forming apparatus has the address which the external apparatus is able to access.

* * * * *